73-660 SR
OR 3,228,235
SEARCH ROOM

Jan. 11, 1966 G. H. THOMAS 3,228,235

COMBINATION AMPLIFIER, OSCILLATOR AND FILTER

Filed Jan. 23, 1962 2 Sheets-Sheet 1

INVENTOR.
GLEN H. THOMAS
BY Murray & Young
ATTORNEYS

COMBINATION AMPLIFIER, OSCILLATOR AND FILTER

Filed Jan. 23, 1962 2 Sheets-Sheet 2

INVENTOR.
GLEN H. THOMAS
BY Murray & Young
ATTORNEYS

United States Patent Office 3,228,235
Patented Jan. 11, 1966

3,228,235
COMBINATION AMPLIFIER, OSCILLATOR AND FILTER

Glen H. Thomas, Columbus, Ohio, assignor to International Research and Development Corporation, Worthington, Ohio, a corporation of Ohio Filed Jan. 23, 1962, Ser. No. 168,048
5 Claims. (Cl. 73—71.4)

Figure 1:
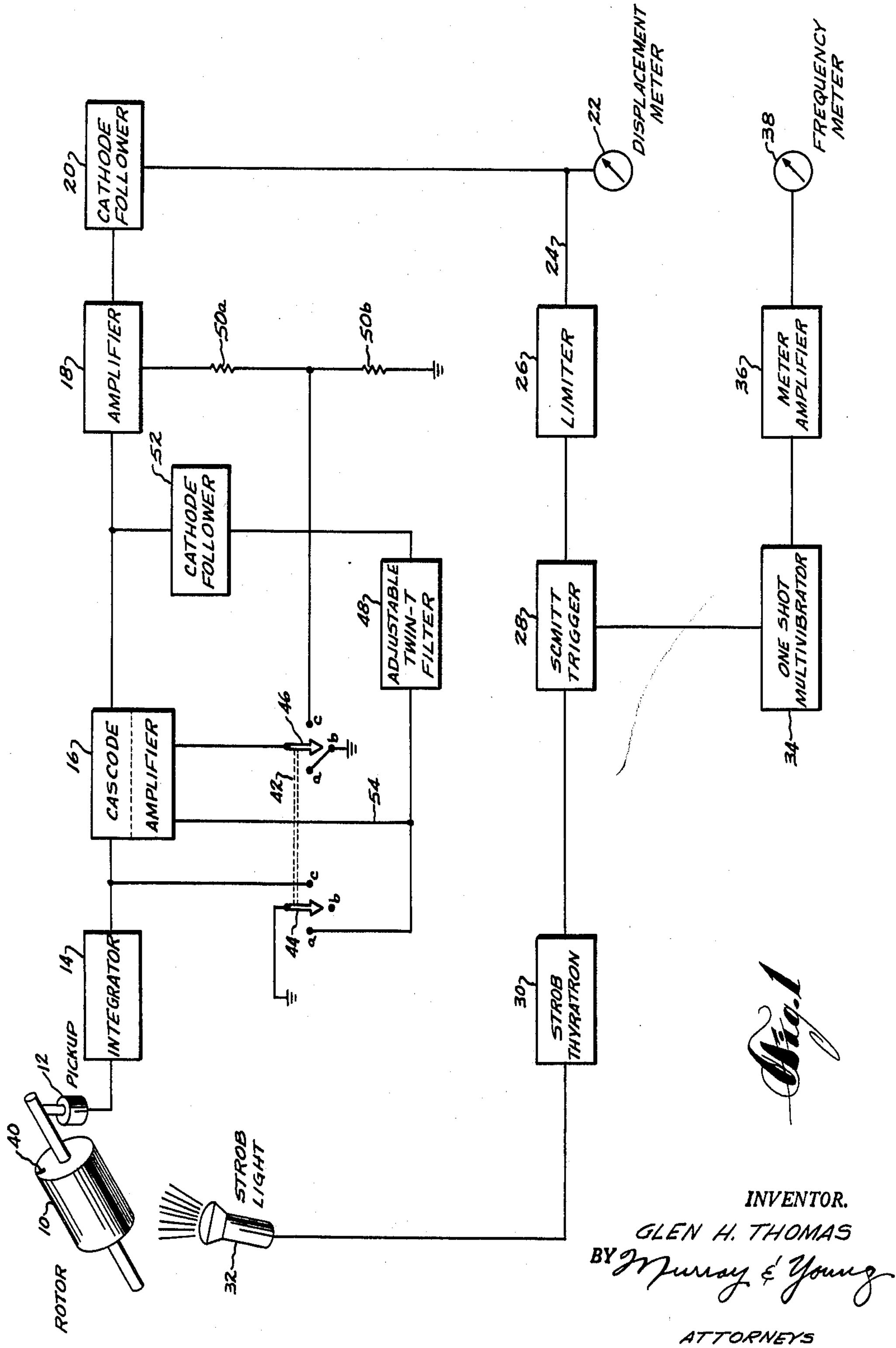

This invention relates to new and improved amplifier, filter and oscillator circuitry. More particularly, this invention relates to circuitry adapted for use in electronic vibration analyzing equipment which can selectively perform the separate functions of an oscillator, an amplifier, and a filter with a minimum number of components.

Although not limited thereto, the present invention is particularly adapted for use with an electronic vibration analyzer of the general type shown in U.S. Patent No. 2,711,647 issued June 28, 1955. Such an analyzer consists of an electro magnetic transducer or vibration pickup which transforms mechanical vibrations into electrical oscillations having a frequency equal to that of the vibrations and having an amplitude proportional to the magnitude of the vibrations. The resulting signal is then shaped in suitable circuitry and employed to periodically fire a strobe light at the oscillation frequency. Thus if the vibrations are being picked up from a single rotating part, the strobe light will be fired once during each revolution of the part; and if the strobe light is directed onto the vibrating part, a visible mark on that part will appear to be stationary.

By applying trial weights to the rotating part and observing the angular shift of the part as viewed under the flashing strobe light, the heavy point of the part causing the vibration can be located and its magnitude can be determined so that the unbalance condition can be corrected.

Such apparatus may contain an individual amplifier for the electrical oscillatory signals; may contain filter circuitry in order that the amplifier will amplify only those oscillatory signals which occur at the rotating frequency of the rotating element (or some multiple or aliquot fraction of that frequency); and may contain an oscillator circuit which can be utilized to study any rotating object in simulated slow-motion, to serve as a tachometer to determine speeds of rotating elements and to calibrate the filter components.

Heretofore such vibration analyzing apparatus has included separate amplifier circuitry, separate filter circuitry and separate oscillator circuitry.

FUNCTION OF THE AMPLIFIER

When the rotating element under inspection exhibits vibrations at a single frequency, the resulting electrical signal produced by the pickup can be simply amplified and applied to an amplitude meter which indicates the displacement of the vibrations. Under these circumstances, a mark on the rotor will appear to be frozen in a fixed position when viewed under the influence of a strobe light which is triggered by the electrical signal; and the balancing procedure is relatively straightforward.

FUNCTION OF THE FILTER

It often happens that two or more sources of unbalance are present in a piece of equipment and are vibrating at different frequencies with the result that a composite oscillatory signal including possibly several different frequencies will be produced by the pickup. Consequently, it becomes necessary to employ a band rejection filter or the like which will separate a particular frequency from different frequencies such that the strobe light will fire at the frequency of vibration of only one source of unbalance. The unbalance source which is vibrating at the frequency to which the filter is selectively tuned can then be determined by directing the strobe light on the rotating part. Suitable balancing corrections for that source of unbalance can be effected by adding corrective weights or removing weight according to the indicated unbalance.

FUNCTION OF THE OSCILLATOR

An internal oscillator may be provided which will fire a strobe light independently of the pickup signals. By selecting an oscillator frequency which is slightly greater or slightly less than the rotating frequency of a rotor under inspection, the rotor will appear to move in slow motion under the influence of the flashing strobe light. This permits slow-motion studies of oscillating or reciprocating parts. The oscillator also may be utilized to adjust the filter in the apparatus by regulating the filtering band rejection adjustment until the oscillator-fired strobe light causes a rotating element to appear stationary. The oscillator further may be utilized as a tachometer to determine exact rotating speeds of rotating elements with the aid of a strobe light which is fired by the oscillator signals.

The principal object of this invention is to provide new and improved vibration analyzing equipment of the general type described above wherein minimum circuitry serves the multiple purposes of amplification, filtering and oscillating.

A further object of this invention is to provide a new and improved oscillator circuit employing both positive and negative feedback.

In accordance with the invention, there is provided an amplifying device, positive and negative feedback paths for the amplifying device, a filter in the negative feedback path, and switch means for selectively connecting both, one or neither of the feedback paths to the amplifying device. Preferably, the filter in the negative feedback path comprises an adjustable twin-T null network or the like which will pass all frequencies other than a narrow preselected frequency band.

(A)—*As an oscillator*

By connecting both the negative and positive feedback paths to the amplifying device, the negative feedback signal will cancel the positive feedback signal at all frequencies other than that to which the network is tuned. In this manner, the circuit will produce oscillations at the tuned frequency of the network by virtue of the positive feedback signal.

(B)—*As a filter*

To employ the equipment as a filter alone, only the negative feedback path is connected to the amplifying device, the result being that the negative feedback signal will attenuate input signals applied to the circuit at all frequencies other than the selected frequency to which the twin-T network is tuned. Thus, the circuit will pass only a narrow band of frequencies determined by the network in the negative feedback path.

(C)—*As an amplifier*

To employ the circuitry as a simple amplifier, both negative and positive feedback paths are disconnected from the amplifying device.

Figure 2:
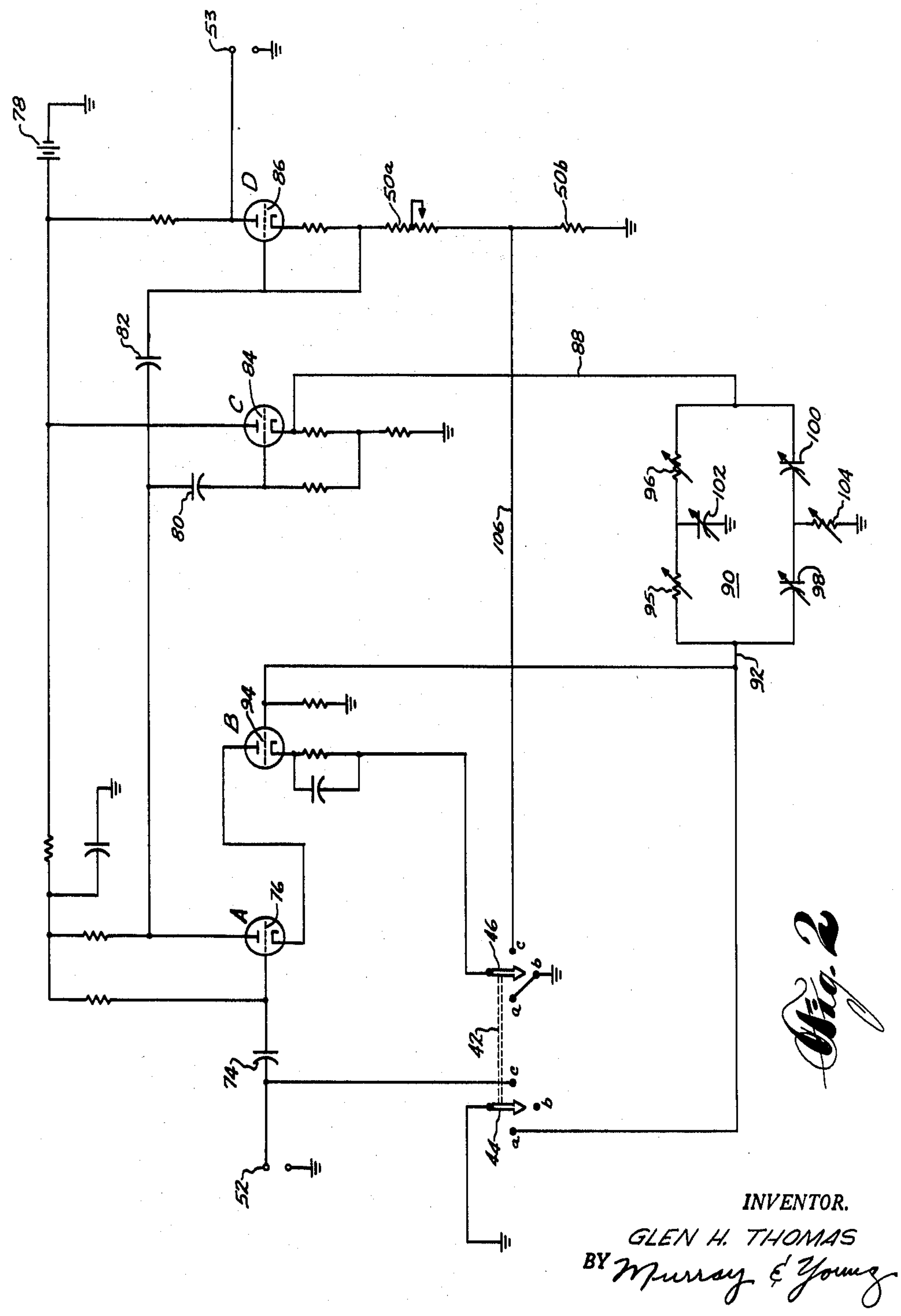

The above and other objects and features of the invention will become apparent from the following detailed description taken in connection with the accompanying drawings which form a part of this specification, and in which:

FIGURE 1 is a schematic block diagram of a typical vibration analyzer with which the present invention may be employed; and FIG. 2 is a detailed schematic circuit diagram of the invention.

Referring now to the drawings, and particularly to FIG. 1, vibrations caused by a rotating part 10, for example, are sensed by an electromagnetic transducer or vibration pickup 12. The output of the transducer 12 will be a sine wave having a frequency equal to that of the frequency of vibration of part 10, and an amplitude proportional to the velocity of the vibration where a transducer of the type described in U.S. Patent No. 2,754,435 is utilized. This signal is applied through an integrator 14 to a cascode amplifier 16. The integrator 14 converts the velocity corresponding signal to a displacement corresponding signal related to the actual amplitude of the mechanical vibrations. The output of amplifier 16 is, in turn, connected to an amplifier 18, a cathode follower 20 and a displacement meter 22. The displacement meter 22 receives a steady-state signal having a magnitude proportional to the amplitude of the alternating current signal and provides a visual indication of that amplitude as a measure of the mechanical vibrations exhibited by the rotor 10.

The output signal is also applied through a conductor 24 to a limiter 26 and Schmitt trigger circuit 28 which act as an amplifier and as a wave-shaping circuit for transforming the alternating current signal into a series of pulses. This results in the generation of one sharp electrical pulse for each cycle of vibration, the pulse occurring as the alternating electrical signal goes through the zero value (or some other predetermined value) in the positive direction. From trigger 28, the sharp pulses having a frequency equal to that of the vibrations are applied through a strobe thyratron 30 to a strobe light 32 which will periodically flash at the frequency of the vibrations. The output of Schmitt trigger 28 is also applied through one-slot multivibrator 34 and one meter amplifier 36 to a frequency meter 38. The multivibrator 34 and amplifier 36 are adapted to produce steady-state signal having a magnitude proportional to the frequency of the input pulses applied thereto.

Provided on the periphery of the rotating part 10 is a mark 40 which will appear frozen or stationary in one position when viewed under the influence of the strobe light due to the fact that the strobe fires once during each revolution of the rotor 10. By adding weights to the rotor 10 at various points on its periphery and by observing the shift in the position of the mark 40 under the influence of the strobe light 32, the heavy point of the rotor 10 can be located and the condition corrected to eliminate the unbalance.

A mechanically ganged switch 42 includes two separate switch arms 44 and 46 which are provided each with three taps labeled **44*a*, 44*b*, 44*c*; and 46*a*, 46*b*, 46*c*, respectively. With the switch 42** in the "*a*" position, the present circuitry operates as an amplifier. With the switch 42 in the "*b*" position, the present circuitry operates as a filter and amplifier. With the switch 42 in the "*c*" position, the present circuitry operates as an oscillator. Taps **46*a* and 46*b* are grounded. Tap 44*b* is an open contact. Tap 44*a* is connected to the output of an adjustable band rejection filter 48. Tap 46*c* is connected to the midpoint of a grounding resistor 50*a*–50*b* which receives the output signal of the amplifier 18. Tap 44*c* is connected to the input of the cascode amplifier 16**.

Swing arm 44 is grounded. Swing arm 46 is connected to the cascode amplifier 16 as a feedback conductor.

Interposed between the cascode amplifier 18 and the adjustable band rejection filter 48 is a cathode follower 52. A conductor 54 connects the output of the band rejection filter 48 to the cascode amplifier 18 as a feedback conductor.

OPERATION AS AN AMPLIFIER

With the switch 42 in the "*a*" position, the present circuitry operates as an amplifier. The swing arm 44 serves to ground the output of the adjustable band rejection filter 48 through the tap **44*a*. Hence there is no negative feedback into the cascode amplifier 16 through the conductor 54. The swing arm 46 is grounded through the tap 46*a* so that there is no positive feedback signal entering into the cascode amplifier 16**. Thus in the "*a*" position, the signal from the integrator 14 is amplified in the cascode amplifier 16 and delivered through the amplifier 18 and cathode follower 20 to the displacement meter 22. In addition, the resultant signal also enters into the limiter 26 as hereinabove described.

The resultant circuitry provides simple amplification.

OPERATION AS A FILTER

With the switch 42 in the "*b*" position, the present circuitry serves as a combination filter-amplifier. The swing arm 44 is connected to an open tap **44*b*; hence the output of the band rejection filter 48 is not grounded through the switch 44 and thus is available as a negative feedback through the conductor 54. The swing arm 46 is grounded through the tap 46*b* and hence provides no positive feedback path for the cascode amplifier 16**.

Since the filter 48 is of the narrow band rejection variety, amplifier 16 will pass only a narrow band of frequencies. By adjusting the filter 48 such that amplifier 16 will pass signals of a frequency equal to the rotational speed of a particular part of the equipment under inspection, the unbalance of that element can be determined. For example, if the selected element is rotating at 12,000 revolutions per minute, the filter 48 is adjusted to attenuate frequencies of 12,000 cycles per minute. The strobe light 32 will flash so long as the amplitude of vibration is sufficient to trigger the strobe light at the frequency, i.e., so long as the mechanical vibration at that frequency is sufficient.

The negative feedback signal in conductor 54 contains all of the frequencies of the original signal except those which were attenuated in the filter 48. Hence in the cascode amplifier, the negative feedback signal cancels out all frequencies from the original signal except those which are attenuated out of the signal by the filter 48. Thus the output of the cascode amplifier in the "*b*" position is an amplified signal including those frequency components which correspond to the bandpass adjusted frequency of the filter 48.

OPERATION AS AN OSCILLATOR

With the switch 42 in the "*c*" position, the present circuitry operates as an oscillator. The swing arm 44 is grounded and receives the output signal from the integrator 14 through the tap **44*c*. Thus there is no input to the cascode amplifier 16 from the integrator 14. The band rejection filter 48 provides a negative feedback signal through the conductor 54 to the cascode amplifier 16. The swing arm 46 receives a positive feedback signal from the midpoint of the grounding resistor 50*a*–50*b* through the tap 46*c* and introduces this positive feedback signal to the cascode amplifier 16. The negative feedback signal passing through the band rejection filter 48 contains all frequencies except those which are attenuated in the band rejection filter 48, i.e., those frequencies to which the band rejection filter 48** is tuned.

The positive feedback signal from the amplifier 18 has its phase inverted from that of the negative feedback signal. Thus at all frequencies other than that which is not passed through the band rejection filter 48, the negative feedback signal cancels out the positive feedback signal. At the tuned frequency, there is no negative feedback and hence those frequencies from the positive feedback signal are presented as oscillations. These oscillations are applied through the cathode follower 20 to the limiter 26 and its associated circuitry for firing the strobe light 32 as the desired frequency which may be observed directly by reading of the frequency meter 38.

Thus the present circuitry serves as an oscillator at frequencies which are regulated through the adjustable filter 48. The oscillator signal may be utilized to fire the strobe light 32 at any selected frequency. Such circuitry allows for slow-motion studies of any rotating part by adjusting the strobe light flash rate to a value which is slightly higher or slightly lower than the rotating velocity of a rotating element.

Slow-motion studies also can be carried out by regulating the strobe flash frequency slightly higher or slightly lower than an integral multiple or an aliquot fraction of the rotating velocity of the rotating element. In these slow-motion studies, the rotating part appears to move slowly because the strobe flashes occur at different points of each cycle of motion.

The oscillator circuitry also may be utilized in combination with the strobe light 32 as a tachometer. In this procedure, the strobe-flash rate is adjusted by varying the band rejection frequency of the filter 48 to a high value. Thereafter the flash rate is reduced while the strobe is allowed to flash against the mark 40 of the rotor 10 until the mark 40 appears to be stationary. The frequency of strobe flashing is noted. The strobe light frequency again is adjusted downwardly until the mark 40 again appears to be frozen and the second frequency is noted. By well-known harmonic frequency calculations, the frequency of the rotation of the moving element can be determined.

Perhaps the most useful application of the oscillator circuitry is in the actual tuning adjustments of the adjustable filter 48. In those instances where the actual rotating speed of a motor, for example, is known (according to its nameplate), the filter can be adjusted to that known speed and, by activating the strobe light 32, minor fractional adjustments can be made so that the mark 40 appears to be frozen on the rotor 10. At that setting, the filter 48 is properly correlated with the rotor 10.

At all frequencies other than that to which the twin-T null network 48 is tuned, the negative feedback signal through switch 44 will attenuate or cancel the input signal applied to the cascode amplifier 16. However, at that frequency to which the twin-T network is tuned, no attenuating negative feedback signal will occur; and the signal of that particular frequency will pass through the cascode amplifier 16 to the amplifier 18, the cathode follower 20 and the displacement meter 22. Thus, under these circumstances, the circuit acts as a filter.

Referring now to FIG. 2, the combination amplifier, filter and oscillator of the invention includes four triode tubes or signal translating devices A, B, C and D. Input terminal 52 is connected through capacitor 74 to the grid 76 of the first triode A. The anodes of tubes A, C and D are each connected to the positive terminal of a source of plate voltage, such as a battery 78 having its negative terminal grounded. The anode of triode B, however, is connected directly to the cathode of triode A such that the two triodes are connected in series. Output signals at the plate of triode A are applied through coupling capacitors 80 and 82 to the grids 84 and 86 of triodes C and D, respectively. The cathode of triode C is connected through lead 88, and adjustable twin-T null network 90 and lead 92 to the grid 94 of triode B.

As is well known to those skilled in the art, a parallel T null network is a three-terminal network so proportioned as to have substantially zero transfer admittance at some particular frequency. Input signals are applied between lead 88 and ground, while the output signals are derived between lead 92 and ground. The network 90 includes two parallel paths between leads 88 and 92. One path includes a pair of series-connected resistors 95 and 96, while the other path includes a pair of series-connected capacitors 98 and 100. The junction of resistors 95 and 96 is connected to ground through capacitor 102 as shown, while the junction of capacitors 90 and 100 is connected through resistor 104. All of the circuit components of the filter 90 are adjustable; and thus the rejection frequency of the filter may be varied to suit requirements.

As an alternative to the specific twin-T filter illustrated in FIG. 2, it is possible to utilize a twin-T filter having a single variable resistor as described in copending application Serial No. 7,951, filed February 10, 1960 now Patent No. 3,072,868 and assigned to the assignee of this invention.

It will be apparent that with the arrangement shown, a negative feedback path is provided through leads 88 and 92, the signal arriving at the grid 94 of triode B being approximately 180° out of phase with the signal applied to the grid 76 of triode A. Depending upon the quality of filtering, the negative feedback signal will be more-or-less out of phase by 180°. The gang switch 42 in the illustration of FIG. 2 includes two movable swing arms 44, 46, corresponding with those of FIG. 1. In the indicated "*b*" position, the cathode of triode B will be connected to ground through tap **46*b*, and a signal approximately 180° out of phase with that applied to the grid 76 of triode A will be applied to the grid 94 of triode B. Under these circumstances, the circuit acts as a filter. That is, the degenerative feedback signal through leads 88 and 92 will cancel or attenuate the input signal applied to terminal 52 at all frequencies other than the rejection or null frequency of filter 90** since at this frequency the filter has zero transfer admittance and no degenerative feedback signal is applied.

When the gang switch 42 is in position "*c*," the circuit acts as an oscillator. Under these circumstances, input terminal 52 is grounded through tap **44*c* and swing arm 44, and the cathode of triode D is connected through resistor 50*a*, lead 106, tap 46*c* and swing arm 46 to the cathode of triode B. Since the cathode of triode D is now connected to the cathode of triode B, a positive feedback signal is applied to triode A; and, in the absence of a negative feedback signal through filter 90, the circuit will oscillate due to the positive feedback signal. Since, however, there will be an absence of a negative feedback signal only at the frequency to which the filter 90** is tuned, the circuit will oscillate only at that particular frequency.

If it is desired to employ the circuit of FIG. 2 for simple amplification, the gang switch 42 is moved to the "*a*" position. Under these circumstances, lead 92 is grounded so that a negative feedback signal is no longer applied to the grid 94 of triode B. At the same time, the cathode of triode B is grounded through the swing arm 46 and tap **46*a*, and this triode B simply acts as a grounded grid amplifier in series with triode A. The output of the triode A is further amplified in triode D before it reaches the output terminal 53**.

By virtue of the fact that the network 90 determines the bandpass of the circuit when used as a filter and also the ocillation frequency of the circuit when used as an oscillator, the arrangement provides a simple means for tuning the filter in determining whether one of several parts on a piece of equipment are vibrating significantly. In order to arrive at a particular bandpass frequency for one of several rotating parts on a piece of equipment, the switch 42 will be moved to the "*c*" position shown in FIG. 2 so that the circuit acts as an oscillator. Under these circumstances, the strobe light can be used as a tachometer and the filter network 90 can be adjusted to the proper frequency corresponding to the rotational speed of a part being viewed in the manner described above. This automatically adjusts the bandpass of the circuit when used as a filter. Thus, the circuit eliminates separate tuning of the filter which would be required in a case where an independent oscillator and filter are employed.

It can thus be seen that the present invention provides a combination amplifier, filter and oscillator employing a minimum number of circuit components. Although the invention has been shown in connection with a certain specific embodiment, it will be readily apparent to those skilled in the art that various changes in form and arrangement of parts may be made to suit requirements without departing from the spirit and scope of this invention. In this respect, it will be apparent that transistors could be substituted for the vacuum tubes shown herein.

I claim as my invention:

1. Vibration analyzing apparatus comprising a device for converting mechanical vibrations into an alternating current signal having a frequency proportional to the frequency of the vibrations and an amplitude proportional to the magnitude of the vibrations, a signal amplifying device, means for applying said alternating current to said signal amplifying device, a positive feedback path for the amplifying device, a negative feedback path for the amplifying device, filter means in the negative feedback path adapted to pass all frequencies other than a preselected frequency, means for selectively connecting both the positive and negative feedback paths to the amplifying device such that the signal in the negative feedback path will cancel the effect of the signal in the positive feedback path except at said preselected frequency whereby oscillations of said preselected frequency will be produced at the output of the amplifying device, means for selectively connecting the negative feedback path to the amplifying device while disconnecting the positive feedback path therefrom such that the negative feedback signal will attenuate all signals applied to the amplifying device other than a signal having said preselected frequency, means for selectively disconnecting both of the feedback paths from the amplifying device, and means including phase indicating means, and a displacement meter connected to the output of said signal amplifying device.

2. In vibration analyzing apparatus of the type having an electromechanical device for converting mechanical vibrations into an alternating current signal having a frequency proportional to the frequency of the vibrations and an amplitude proportional to the magnitude of the vibrations, the combination of circuit apparatus connected to said device and having a first function wherein it amplifies said alternating current signal, a second function wherein it acts as a filter for said alternating current signal, and a third function wherein it is unresponsive to said alternating current signal and functions as an oscillator; the said circuit apparatus comprising a signal amplifying device, a positive feedback path for the amplifying device, a negative feedback path for the amplifying device, filter means in the negative feedback path adapted to pass all frequencies other than a preselected frequency, a multiple-position switch device, circuit means including said switch device for selectively connecting both the positive and negative feedback paths to the amplifying device while preventing the application of said alternating current signal thereto when the switch device is in one of its positions such that the signal in the negative feedback path will cancel the effect of the signal in the positive feedback path except at said preselected frequency whereby oscillations of said preselected frequency will be produced at the output of the amplifying device, circuit means including said switch device for selectively connecting only the negative feedback path to the amplifying device when the switch device is in a second of its positions such that the negative feedback signal will attenuate all signals applied to the amplifying device other than a signal having said preselected frequency and the circuit apparatus will operate as a filter, and circuit means including said switch device for selectively disconnecting both of the feedback paths from the amplifying device at a third position of the switch device whereby the circuit apparatus will function as an amplifier.

3. In vibration analyzing apparatus of the type including an electromechanical device for converting mechanical vibrations into an alternating current signal having a frequency proportional to the frequency of the vibrations and an amplitude proportional to the magnitude of the vibrations, the combination of circuit apparatus adapted to be connected to said electromechanical device through an electrical conductor and having a first function wherein it amplifies said alternating current signal, a second function wherein it filters said alternating current signal, and a third function wherein it is unresponsive to said alternating current signal and operates as an oscillator; the said circuit apparatus comprising first, second, third and fourth signal translating devices each having an anode, cathode and control electrode therein, a source of driving potential having one terminal connected to the anodes of said first, third and fourth signal translating devices and its other terminal grounded, the connection between said one terminal and the anode of said first signal translating device including a load resistor, means for applying an input signal between the control electrode of said first signal translating device and ground, means for deriving an output signal between the anode of the fourth signal translating device and ground, means connecting the cathode of the first signal translating device to the anode of the second signal translating device, a connection between the anode of said first signal translating device and the control electrodes of said third and fourth signal translating devices, means including a filter network connecting the cathode of the third signal translating device to the control electrode of the second signal translating device, three-position switch means having a first position in which it connects the cathode of said fourth signal translating device to the cathode of said second signal translating device while connecting the control electrode of the first signal translating device to ground whereby the circuit apparatus is unresponsive to the electrical signal from said electromechanical device and operates as an oscillator, said switch means having a second position in which it connects the cathode of said second signal translating device to ground whereby the circuit apparatus operates as a filter for said alternating current signal, and said switch means having a third position in which it grounds both the control electrode and cathode of the second signal translating device whereby the circuit apparatus operates as an amplifier for amplifying said alternating current signal.

4. The combination of claim 3 wherein said filter network comprises a twin-T filter adapted to reject signals of a predetermined frequency.

5. In vibration analyzing apparatus of the type including an electromechanical device for converting mechanical vibrations into an alternating current signal having a frequency proportional to the frequency of the vibrations and an amplitude proportional to the magnitude of the vibrations, the combination of circuit apparatus adapted to be connected to said device through an electrical conductor and having a first function wherein it amplifies said alternating current signal, a second function wherein it acts as a filter for said alternating current signal, and a third function wherein it is unresponsive to said electrical signal and acts as an oscillator; the said circuit apparatus comprising first, second, third and fourth signal translating devices each having an anode, cathode and control electrode therein, a source of driving potential for said signal translating devices, connections between the anodes of the signal translating devices and said source of anode potential with the connection between the anode of the first signal translating device and the source of anode potential including a load resistor, means connecting the cathode of the first signal translating device to the anode of the second signal translating device, a connection between the anode of the first signal translating device and the control electrodes of said third and fourth signal translating devices, means for deriving an output signal from the anode of said fourth signal translating device, means including a filter network connecting the cathode of said third signal translating device to the control electrode of the second signal translating device, first switch means for selectively connecting the cathode of said fourth signal translating device to the cathode of said second signal translating device while preventing the application of input signals to the control electrode of the first signal translating device whereby the circuit apparatus functions as an oscillator, second switch means for interconnecting the cathode and control electrode of said second signal translating device whereby the circuit apparatus functions as an amplifier for said alternating current signal, and third switch means for connecting the cathode of said second signal translating device to said source of anode potential whereby the circuit apparatus will act as an amplifier for said alternating current signal.

References Cited by the Examiner

UNITED STATES PATENTS

| | | | |
|---|---|---|---|
| 2,173,427 | 9/1939 | Scott | 331—142 |
| 2,586,167 | 2/1952 | Kamm | 331—59 |
| 2,679,629 | 5/1954 | Hellar | 73—71.4 X |
| 2,711,647 | 6/1955 | Ongaro et al. | 73—71.4 |
| 2,754,374 | 7/1956 | Enright | 330—9 |
| 2,754,679 | 7/1956 | Petroff | 73—71.4 |

OTHER REFERENCES

Mandl, M.: Handbook of Basic Circuits, Macmillan Co., 1956, Scientific Library.

RICHARD C. QUEISSER, *Primary Examiner.*